(No Model.)

M. PACHOLDER.
SELF ADJUSTING BOX.

No. 282,359. Patented July 31, 1883.

Witnesses:
Geo. H. Miatt
S. F. Sullivan

Inventor:
Morris Pacholder
By his Attorney
E. N. Dickerson Jr.

UNITED STATES PATENT OFFICE.

MORRIS PACHOLDER, OF BALTIMORE, MARYLAND.

SELF-ADJUSTING BOX.

SPECIFICATION forming part of Letters Patent No. 282,359, dated July 31, 1883.

Application filed August 9, 1880. (No model.)

*To all whom it may concern:*

Be it known that I, MORRIS PACHOLDER, of the city of Baltimore and State of Maryland, have invented a new and useful Improvement in Self-Adjusting Boxes, of which the following is a full, true, and exact description, reference being had to the accompanying drawings.

My invention relates to a box which will automatically accommodate itself to the volume of the contained substance; and it is especially applicable to a box containing cigarettes or cigars, and similar bodies which are liable to injury by shaking or rattling in the box after they have been partly consumed.

My invention consists in the peculiar arrangement of parts, fully described hereinafter, whereby a cover within the box is caused to press tightly the bodies contained therein by an elastic band extending through slots in the sides of the said box.

The invention further consists in a construction whereby the cover is flexibly hinged to the box.

Figure 1:
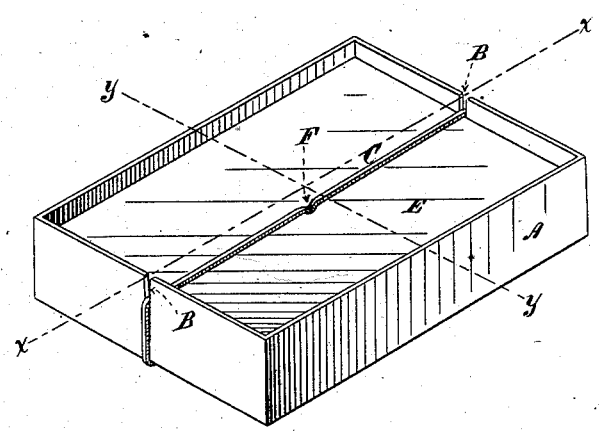
Figure 2:
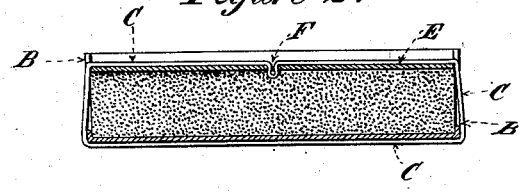
Figure 3:
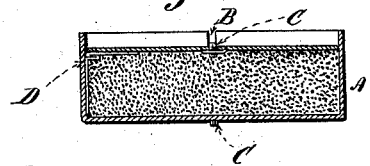
Figure 4:
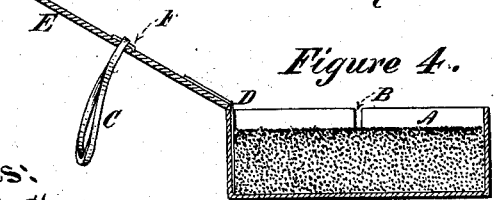

My invention will be clearly understood from the accompanying drawings, in which Figure 1 represents a general view, and Fig. 2 a section on the line *x x;* Fig. 3, a section on the line *y y;* and Fig. 4, the same section as Fig. 3, showing the lid open.

A represents a box, preferably rectangular, as shown. E represents the cover, somewhat smaller in size than the box, and adapted to fit closely and to descend within it. The cover is attached to the box by a flexible hinge of cloth or similar material, D. This cloth is attached to the lid, and is also attached to the bottom of the box, but is loose at the upper part, so as to permit a vertical as well as a swinging movement of the lid. An elastic band, C, is attached to this lid or cover at F. The box A is provided with two vertical slots, B B, through which the elastic band C operates.

Fig. 1 shows the box closed and the cover part way down in said box. It is obvious that as the material within the box is exhausted the spring-band C will still farther depress the cover, thereby retaining firmly anything within the box, the hinge material D yielding to the descent of the cover, as shown in Fig. 3.

Other springs besides rubber bands might be used, and the hinge-piece might be dispensed with.

What I claim as my invention, and desire to secure by Letters Patent, is—

1. The combination of a box having sides with slots extending from the edges toward the bottom, a cover fitting within the box, and an elastic band extending through said slots and operating on the cover, substantially as described.

2. The combination of a box and a cover adapted to enter said box, and attached to the box by a flexible hinge, which allows its descent within the box, substantially as described.

3. The combination of a box, a cover adapted to enter such box, and attached to the box by a flexible hinge allowing its descent within the box, and a spring adapted to continually compress the cover against the contained material, substantially as described.

MORRIS PACHOLDER.

Witnesses:
 S. F. SULLIVAN,
 GEO. H. EVANS.